US009928283B2

(12) United States Patent
Catalano, Sr. et al.

(10) Patent No.: US 9,928,283 B2
(45) Date of Patent: Mar. 27, 2018

(54) TRACING DATA THROUGH A TRANSFORMATION PROCESS USING TRACER CODES

(71) Applicant: Validus Solutions, Inc., Cambridge, MA (US)

(72) Inventors: Richard John Catalano, Sr., Hot Springs Village, AR (US); Daryl David Crockett-Grabus, Southborough, MA (US)

(73) Assignee: VALIDUS SOLUTIONS, INC., Cambridge, MA (US)

( * ) Notice: Subject to any disclaimer, the term of this patent is extended or adjusted under 35 U.S.C. 154(b) by 490 days.

(21) Appl. No.: 14/252,662

(22) Filed: Apr. 14, 2014

(65) Prior Publication Data

US 2014/0310233 A1 Oct. 16, 2014

Related U.S. Application Data

(60) Provisional application No. 61/812,047, filed on Apr. 15, 2013.

(51) Int. Cl.
  *G06F 17/30* (2006.01)
(52) U.S. Cl.
  CPC .............. *G06F 17/30563* (2013.01)
(58) Field of Classification Search
  CPC ................ G06F 17/30563; G06F 17/30569
  USPC .................................................. 707/602, 756
  See application file for complete search history.

(56) References Cited

U.S. PATENT DOCUMENTS

| 6,339,775 | B1 | 1/2002 | Zamanian et al. |
| 6,490,590 | B1 | 12/2002 | Fink |
| 7,370,033 | B1 | 5/2008 | Roychowdhury |
| 7,596,573 | B2 | 9/2009 | O'Neil et al. |
| 7,716,257 | B2 * | 5/2010 | Thomson .......... G06F 17/30539 707/705 |

(Continued)

FOREIGN PATENT DOCUMENTS

| EP | 2079020 | 7/2009 |
| WO | 2002047463 | 6/2002 |

(Continued)

OTHER PUBLICATIONS

Crockett-Grabus, Daryl et al., U.S. Appl. No. 13/859,268, entitled "Method and system for controlling and monitoring data migration and software integration projects", filed Apr. 9, 2013.

*Primary Examiner* — Robert Beausoliel, Jr.
*Assistant Examiner* — Alexandria Bromell
(74) *Attorney, Agent, or Firm* — Greenberg Traurig, LLP

(57) ABSTRACT

Systems and methods to provide tracing of data through a transformation process using tracers added to the data during the transformation. In one embodiment, a method includes: receiving a plurality of data records; processing the data records using a plurality of transformation rules, wherein each of the transformation rules corresponds to a respective one of a plurality of tracers; and adding the tracers to the data records as needed to indicate those of the transformation rules used to process each data record. After processing the data records using the transformation rules, the data records are provided to a target system, and the transformation process is validated using the tracers added to the data records.

11 Claims, 5 Drawing Sheets

(56) References Cited

U.S. PATENT DOCUMENTS

| | | | |
|---|---|---|---|
| 7,734,576 B2* | 6/2010 | Simon | G06F 17/30563 707/602 |
| 7,836,063 B2 | 11/2010 | Salazar et al. | |
| 7,870,012 B2 | 1/2011 | Katz et al. | |
| 7,917,484 B1* | 3/2011 | Vermeulen | G06F 21/105 707/705 |
| 7,930,432 B2 | 4/2011 | Blaszczak | |
| 8,041,760 B2* | 10/2011 | Mamou | G06F 17/30563 707/602 |
| 8,112,742 B2 | 2/2012 | Russell | |
| 8,214,324 B2 | 7/2012 | Joerg et al. | |
| 8,417,715 B1 | 4/2013 | Bruckhaus et al. | |
| 8,452,723 B2* | 5/2013 | Belyy | G06F 17/30563 707/602 |
| 8,494,894 B2 | 7/2013 | Jaster et al. | |
| 8,572,556 B2 | 10/2013 | Rivkin | |
| 8,600,929 B2 | 12/2013 | Paul | |
| 8,626,702 B2 | 1/2014 | Schlueter et al. | |
| 8,639,675 B2 | 1/2014 | Cotichini et al. | |
| 8,639,847 B2 | 1/2014 | Blaszczak et al. | |
| 8,688,625 B1* | 4/2014 | Clark | G06Q 10/00 707/602 |
| 9,659,042 B2* | 5/2017 | Puri | G06F 17/30309 707/707 |
| 2009/0319544 A1 | 12/2009 | Griffin et al. | |
| 2009/0327196 A1* | 12/2009 | Studer | G06F 8/00 706/47 |
| 2011/0066602 A1* | 3/2011 | Studer | G06F 17/2264 707/690 |
| 2011/0295794 A1* | 12/2011 | Venkatasubramanian | G06F 17/30563 707/602 |
| 2011/0320399 A1* | 12/2011 | Ledwich | G06F 17/30563 707/602 |
| 2012/0095973 A1 | 4/2012 | Kehoe et al. | |
| 2012/0173557 A1 | 7/2012 | Russell | |
| 2013/0185249 A1 | 7/2013 | Garg | |
| 2013/0238550 A1 | 9/2013 | Mandelstein et al. | |
| 2014/0114907 A1* | 4/2014 | Kozina | G06F 17/30592 707/602 |

FOREIGN PATENT DOCUMENTS

| | | |
|---|---|---|
| WO | 2009140154 | 11/2009 |
| WO | 2012051389 | 4/2012 |

* cited by examiner

TRACING DATA THROUGH A TRANSFORMATION PROCESS USING TRACER CODES

RELATED APPLICATIONS

The present application claims priority to U.S. Provisional Application Ser. No. 61/812,047, filed Apr. 15, 2013, entitled "METHOD FOR TRACING DATA EXTRACTION AND TRANSFORMATION PROCESSES WITHIN DATA MIGRATION AND SOFTWARE INTEGRATION PROJECTS," by Richard Catalano et al., the entire contents of which application is incorporated by reference as if fully set forth herein.

FIELD OF THE TECHNOLOGY

At least some embodiments disclosed herein relate to data processing systems in general, and more particularly, but not limited to, tracing data through processing by using tracers added to the data.

BACKGROUND

Data migration, software integration, and data integration projects typically involve moving and/or transforming data from one system into another. This data is typically processed through some type of Extract, Transformation, and Load (ETL) cycle according to rules which are collected and then documented. These rules can be numerous, complex, and in some cases require that a single data record proceed through dozens of processes and rules before its ETL migration is complete.

Within the migration process, data records can be extracted, filtered out, combined, duplicated, proliferated, augmented, cleansed, enriched, truncated, replaced, substituted, and transformed, etc., at the record or field level. At the end of this migration process, data is loaded, pushed, or pulled into the target system. The volume of records passing through various processes can number into the millions for just a single data object. Further, there can be upwards of, for example, 100 individual objects (each with its own set up ETL rules) as part of a large data migration and data integration project.

With millions of records passing through so much processing and manipulation within the ETL stage, the migrated data (i.e., the end state) may be significantly different than the original, pre-processed source data (i.e., the original state). Technical team members, data owners, and business users may have difficulty understanding how and why a particular record, field or data set was extracted, filtered out, combined, duplicated, proliferated, augmented, cleansed, enriched, truncated, transformed, etc.

Without the knowledge of the particular rules to which records were subjected to in the course of the migratory process, validating and evaluating the appropriateness, completeness, and correctness of the ETL process is difficult.

SUMMARY OF THE DESCRIPTION

Systems and methods to provide tracing of data through a transformation process (e.g., a data migration, or a transformation implemented as a daily or other periodic transformation process) using tracers added to the data during the transformation are described herein. Some embodiments are summarized in this section.

In one embodiment, a method implemented in a data processing system includes: receiving a plurality of data records; processing, by at least one processor, the data records using a plurality of transformation rules, wherein each of the transformation rules corresponds to a respective one of a plurality of tracers; and adding the tracers to the data records as needed to indicate those of the transformation rules used to process each data record.

In one embodiment, the method further includes, after processing the data records using the transformation rules, providing the data records to a target system; and validating, using the tracers added to the data records, that the processing was properly performed.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
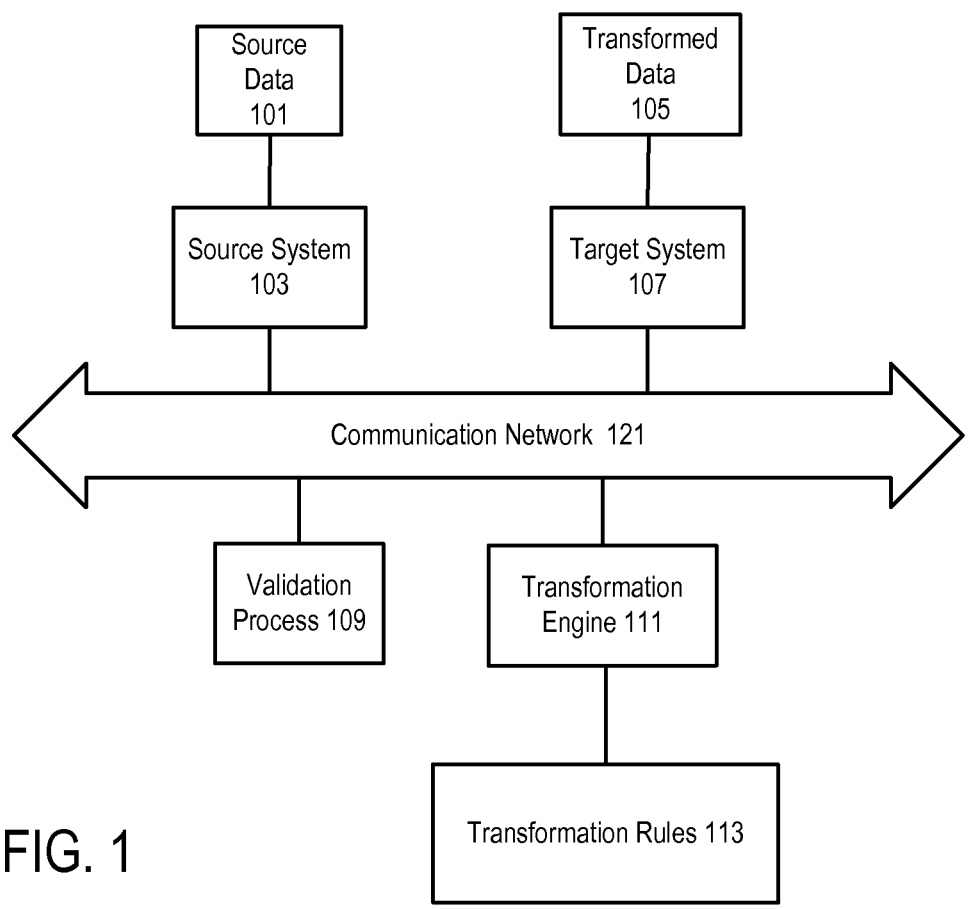
FIG. 1 shows transformation by a transformation engine of source data from a source system to a target system, according to one embodiment.

FIG. 1 shows transformation by a transformation engine 111 of source data 101 from a source system 103 to a target system 107, according to one embodiment. Source system 103 communicates with target system 107 over a communication network 121 (e.g., the Internet, wide area network, local area network, cloud network, communication path for cloud services, etc.). Source data 101 includes data records that are processed by transformation engine 111 to provide transformed data 105 to target system 107. Transformation engine 111 uses transformation rules 113 to implement the transformation process. After this transformation, validation process 109 may be used to confirm that the transformation process was executed properly.

Transformation engine 111 may be, for example, a set of programs that are implemented on a computing server or other device that is different from source system 103 or target system 107. In other embodiments, transformation engine 111 may be implemented by source system 103 and/or target system 107, or further in combination with other computing devices. Validation process 109 may be implemented in software on a dedicated computing device, source system 103, target system 107, or a combination of the foregoing. In some embodiments, transformation engine 111 and/or validation process 109 may be implemented as software as a service (SaaS).

Various embodiments of the disclosure can be implemented in various alternative architectures. In some embodiments, a client server architecture can be used, in which one or more centralized servers may be used to process some of the steps in the transformation process. Thus, embodiments of the disclosure are not limited to a particular architecture.

Figure 2:
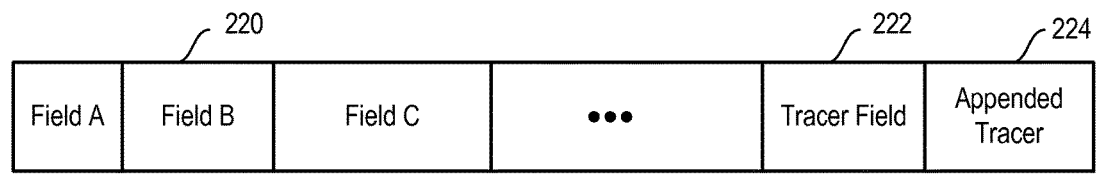
FIG. 2 shows an exemplary data record transformed by the transformation engine of FIG. 1, according to one embodiment.

FIG. 2 shows an exemplary data record 210 transformed by the transformation engine 111 of FIG. 1, according to one embodiment. A transformation process typically transforms a large number of data records. Data record 210 is just one example of a form of data record that may be transformed.

Data record 210 includes numerous fields 220, that correspond to the original data record prior to transformation. During the transformation process, as described below, tracers are added to each data record as steps in the transformation process are completed. In one case, the tracer is added to a tracer field 222. In another case, the tracer is appended as an appended tracer 224 to the data record.

In one embodiment, the tracer added to a record 210 is in the form of a tracer code. This tracer code corresponds to a transformation rule that has been used to process the data record 210. The tracers added to data record 210 are examined by validation process 109 to confirm that the transformation process is proceeding, or has been completed, correctly (e.g., as determined by comparison to predefined standards or other performance criteria).

Figure 3:
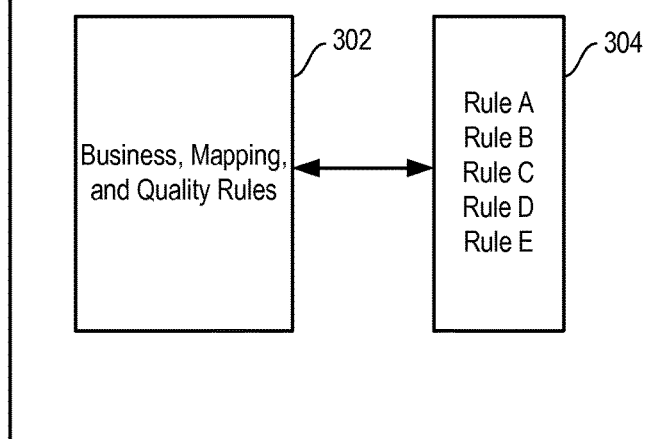
FIG. 3 shows an exemplary set of transformation rules used in the transformation of FIG. 1, according to one embodiment.

FIG. 3 shows an exemplary set of transformation rules 300 used in the transformation process described above, according to one embodiment. Transformation rules 300 may generally include business, field-mapping, data quality, and record filtration rules 302. Each of these rules 302 is given an identification such as "Rule A", "Rule B", etc. as indicated in list 304. In one embodiment, the identification used for each rule (e.g., Rule A) corresponds to the tracer code (e.g., "A") added to data record 210 as described above.

Figure 4:
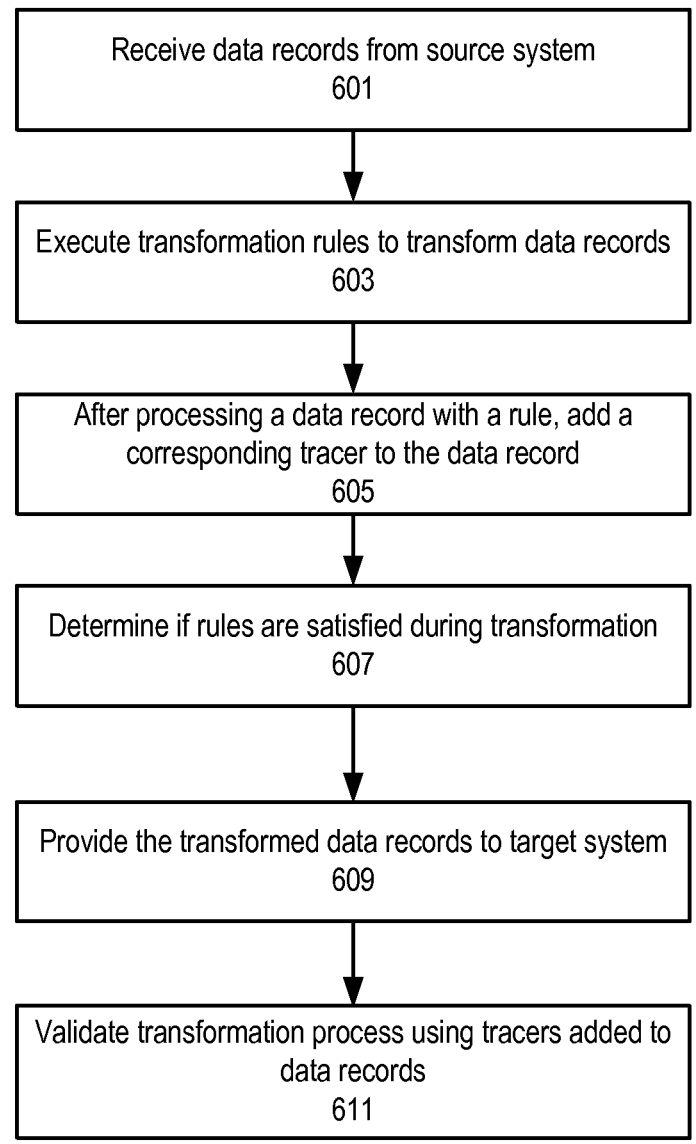
FIG. 4 shows a method to transform data records and validate a transformation process using tracers added to the data records, according to one embodiment.

FIG. 4 shows a method to transform data records and validate a transformation process using tracers added to the data records, according to one embodiment. At block 601, data records are received from source system 103. In one example, the data records are extracted from the source system 103. At block 603, transformation rules 113 are executed to transform the data records into transformed data 105.

At block 605, after each of the data records is processed with a particular transformation rule 300, a tracer is added to the data record, for example as discussed for FIG. 2 above. As a particular data record progresses through the transformation process, tracers are added to the data record to indicate those transformation rules by which the data record has already been processed. In one embodiment, the tracers added to a particular data record provides a process path that can be examined by validation process 109 when confirming proper execution of the transformation process.

At block 607, during the transformation process, a determination is made as to whether certain rules are satisfied. In one embodiment, these rules are a subset of the transformation rules 300 that are executed in the transformation process. In one embodiment, a subset of the original data records that began the transformation process is removed from further transformation as it is determined that particular data records fail to satisfy a particular transformation rule. Satisfaction of the particular rule may require that a given data record satisfy one or more filtration criteria. The filtration criteria are used to determine which data records are to be migrated to or transformed for the target system 107. For example, this transformation rule may require that each of the data records have a field corresponding to the United States, as opposed to other foreign countries.

At block 609, after the data records have been processed by all transformation rules 300, the transformed data records are provided to target system 107. In one example, the data records are provided using a loading process implemented by one or more software routines.

At block 611, the transformation process is validated by validation process 109. In one embodiment, this validation is performed using the tracers added to the data records that were provided to target system 107. In other embodiments, validation may be performed at intermediate points within the transformation process. For example, validation may be performed after only one or a few process rules have been executed in a transformation process having dozens or hundreds of transformation rules.

In one embodiment, a method includes: receiving a plurality of data records; processing, by at least one processor (e.g., a computing device executing transformation engine 111), the data records using a plurality of transformation rules, wherein each of the transformation rules corresponds to a respective one of a plurality of tracers; and adding the tracers to the data records as needed to indicate those of the transformation rules used to process each data record. After processing the data records using the transformation rules, the data records are provided to a target system, and validation is done (e.g., using validation process 109), using the tracers added to the data records, to confirm that the processing has been, or is being, properly performed. Certain or all of the validation steps may be performed manually instead of by computing device if desired for certain implementations.

The plurality of data records includes a first data record (e.g., data record 210), the plurality of transformation rules (e.g., transformation rules 300) includes a first rule (e.g., Rule A), and a first tracer (e.g., "A") is added to the first data record after processing with the first rule. The method further includes determining whether at least one filtration criterion (e.g., a criterion of whether a data record has a field indicating it is a United States record) of the first rule is satisfied by each of the plurality of data records.

In one embodiment, the method further includes removing a subset of the data records from the transformation process in response to each of the subset of data records failing to satisfy the at least one filtration criterion of the first rule.

In one embodiment, the plurality of transformation rules further includes a second rule (e.g., Rule B), and a second tracer (e.g., "B") is added to each of the subset of data records after processing with the second rule. In one embodiment, the transformation rules include business, mapping, and quality rules.

In one embodiment, the adding of the respective tracer to the data record comprises appending a tracer code to the data record. In one embodiment, the adding of the respective tracer to the data record comprises adding a tracer code to a field of the data record.

In one embodiment, the data records are received from source system 103, and the processing using the plurality of transformation rules implements an extract, transformation, and load data migration process from the source system 103 to target system 107. In another embodiment, the data records are received from source system 103, and the processing using the plurality of transformation rules implements a transformation interface between the source system 103 and target system 107.

In another embodiment, the plurality of data records includes a first data record and a second data record, the plurality of transformation rules includes a first rule (e.g., Rule D) and a second rule (e.g., Rule E), a first tracer (D) is added to the first data record after processing with the first rule, and the first tracer (D) is added to the second data record after processing with the first rule (Rule D).

The method further comprises determining whether the second rule is satisfied by the first and second data records. A second tracer (E) is added to the first data record after satisfying the second rule (Rule E).

In one embodiment, the second data record is included in a subset of data records removed from the transformation process after failing to satisfy the second rule. For example, the data records in this subset may be tagged with tracer D. The data records that have satisfied the second rule (Rule E) continue with processing and are tagged with tracers D and E.

In one embodiment, a system (e.g., that runs transformation engine 111) includes: at least one processor (e.g., a multiple server system); and memory storing instructions configured to instruct the at least one processor to: receive a plurality of data records; process the data records using a plurality of transformation rules, wherein each of the transformation rules corresponds to a respective one of a plurality of tracers; and add the tracers to the data records as needed to indicate those of the transformation rules used to process each data record.

In one embodiment, the plurality of data records includes a first data record, the plurality of transformation rules includes a first rule (e.g., Rule D), and a first tracer (D) is added to the first data record after processing with the first rule. The plurality of transformation rules further includes a second rule (e.g., Rule E) executed after processing by the first rule, and a second tracer (E) is added to the first data record after processing with the second rule.

In one embodiment, the transformation rules further include a second rule (e.g., Rule E), and the instructions are further configured to instruct the at least one processor to remove a subset of the data records from the transformation process after failing to satisfy the second rule.

Figure 5:
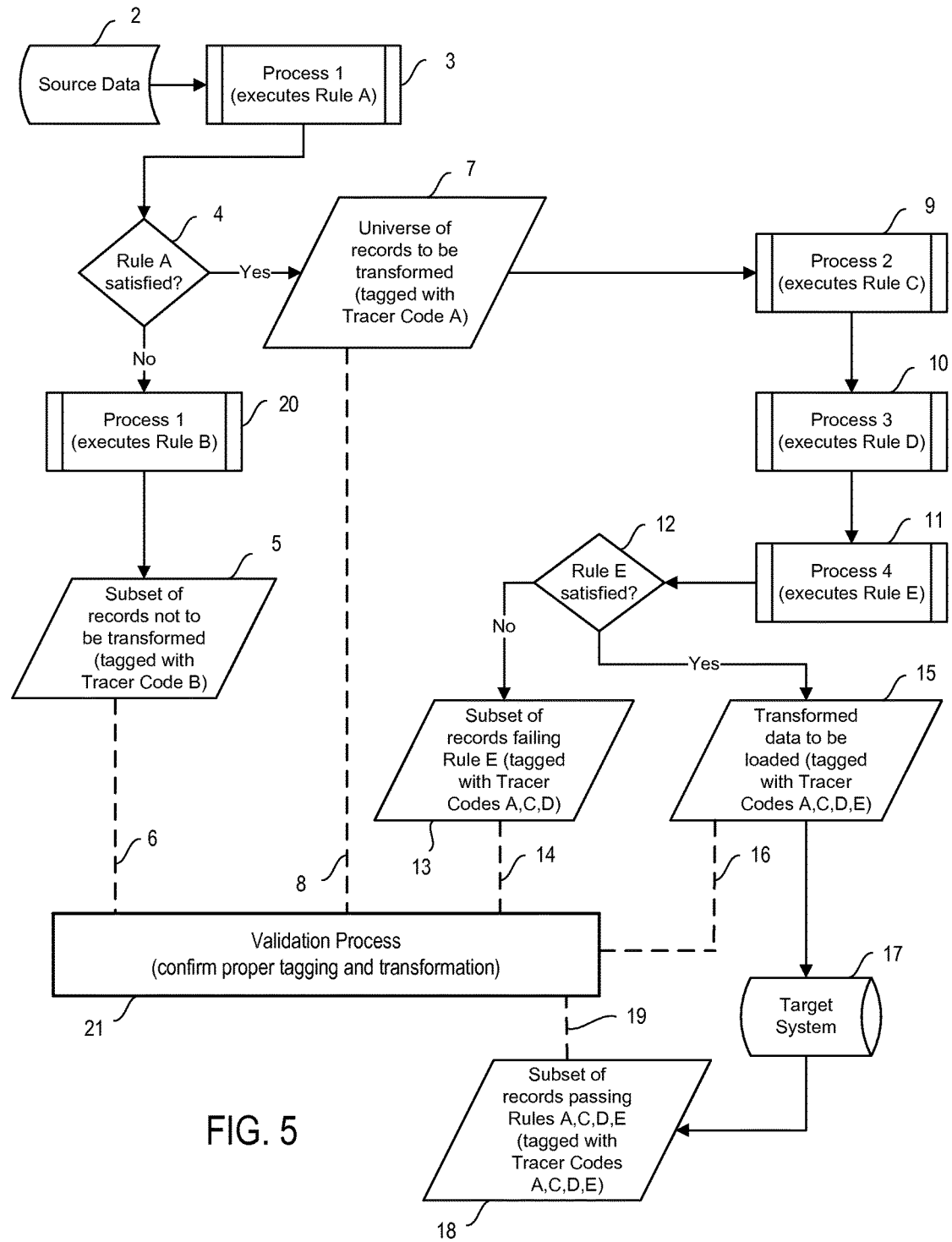
FIG. 5 shows a flowchart of the tagging of data records with tracers that correspond to transformation rules used to process the data records as they move through a transformation process, according to one embodiment.

In one embodiment, a non-transitory computer-readable storage medium stores computer-readable instructions, which when executed, cause a system to: receive a plurality of data records; process, by at least one processor, the data records using a plurality of transformation rules, wherein each of the transformation rules corresponds to a respective one of a plurality of tracers; and add the tracers to the data records as needed to indicate those of the transformation rules used to process each data record (e.g., tracer codes A,C,D,E may be added to a data record that completes all processing as shown in FIG. 5, discussed below).

In one embodiment, the plurality of data records includes a first data record and a second data record, the plurality of transformation rules includes a first rule and a second rule, a first tracer is added to the first data record after processing with the first rule, the first tracer is added to the second data record after processing with the first rule, and the computer-readable instructions further cause the system to determine whether the second rule is satisfied by the plurality of data records. The computer-readable instructions further cause the system to add a second tracer to the first data record after satisfying the second rule.

In a more specific embodiment, by assigning identification (ID) numbers to transformation rules (e.g., business and data rules), one is able to make a list, catalog or database of unique and discrete rules that provide the basis for code development of ETL jobs or processes. Within each ETL process, within the actual code as a code comment, the transformation rule or rules are provided that the ETL process code is addressing. When the full catalog listing of transformation rules is directly compared to the commented ETL code during peer code review sessions, the risk of missing or mis-interpreting requirements during the ETL build phase is significantly reduced or eliminated.

This embodiment provides transformation rule traceability by adding the corresponding transformation catalog rule numbers to a special tracer field for each actual data record as it passes through the ETL process. This tracer field or fields within a migrating or transforming data record contains codes representing all of the transformation rules that the record has passed through on its journey through the relevant ETL transformation process.

This embodiment allows one, in a data migration or integration, to more readily determine if the migrated data has been selected and transformed properly. Data validation may include reviewing, sampling, inspecting and analyzing data at various points in the data migration cycle to ensure that data is being converted correctly and completely. During an actual "cutover window" (i.e., the final time period prior to launch of a new system) downtime, time is limited, and there is less time to do a thorough validation. This embodiment improves the ability to increase the level of confidence that the migrated data is correct, without waiting until data has already been migrated into a target system to determine that the data has been transformed correctly.

In this embodiment, by reviewing the data at various stages within the ETL process, data quality is more readily ensured. ETL developers can create output files that show listings of data affected by certain of the transformation rules, which can be incorporated as part of the validation process. By adding and accumulating the tracers (e.g., tags or codes), and then creating a number of output files for validation at strategic points during the ETL process, the validation process can be streamlined and improved from a statistical level of confidence perspective.

In this embodiment, if the tracer field is loaded with the data record into the target system, then the ETL history of each record can be available for validation purposes, and also for the benefit of the users of the new system who need to understand the history of record with regard to the changes inflicted to that record. This may be particularly helpful with transactional records such as sales orders, invoices, purchase orders, contracts, etc., which typically undergo the most complex and numerous transformations.

FIG. 5 shows a flowchart of the tagging of data records with tracers (e.g., "A" early in processing, or "A,C,D,E" later in processing) that correspond to the transformation rules (e.g., Rule A, . . . , Rule C, Rule D, Rule E) used to process the data records as they move through the transformation process of FIG. 5, according to one embodiment. At step 2, source data 101 is extracted or otherwise received from source system 103. After processing source data 101 through various transformation rules 113, transformed data 105 is provided at step 17 to target system 107. As indicated in step 21, validation process 109 may be used at one or more intermediate points in the transformation process, and/or at the end of the process as indicated at step 19 in order to confirm or validate proper execution of the transformation process. For example, step 18 indicates the remaining subset of data records from the original source data that have been processed by all of the transformation rules of the primary transformation process. This remaining subset can be audited by the validation process 109.

Specific, but merely representative, transformation rules are illustrated in FIG. 5. These rules are indicated at steps 3, 9, 10, 11, and 20. During the transformation processing of the source data (e.g., data records), filtration criterion associated with certain rules may be applied to determine whether some of the data records should be removed from the transformation or migration process. For example, at step 4, if Rule A is not satisfied, then a subset of records is removed from further processing at step 5. At step 12, if Rule E is not satisfied, then further additional data records are removed from further processing at step 13.

In one embodiment, a method tags data records with tracers that correspond to the transformation rules to which data records are subjected as they move through an extract, transformation and load (ETL) data migration process. It is important to note that, generally, there can be hundreds or more of rules and steps within an ETL process for a single data object or set of data records being migrated.

In one embodiment, business requirements and field mapping requirements are collected, documented and cataloged, which provides the basis for the logic inside the ETL process. As illustrated in FIG. 5, at step 2, source system data is made available for the ETL process. Data can be, for example, in the form of direct connection, flat files, xml, documents, worksheets, text files, or any source and connection method.

At step 3, source data is processed through ETL Process 1 (which executes transformation Rule A). At step 4, if the data records, when subjected to Rule A, satisfy filtration criteria in Rule A, then the records are deemed as part of the subset of data (universe of records) that will continue on to be further transformed and/or migrated.

At step 5, records which do not satisfy Rule A are subjected to default Rule B (see step 20). All data records that are not moving on for further processing (i.e., not moving to the file: universe of records to be transformed and migrated) are written to a table, multiple tables, or a file (and correspond to a subset of records not to be migrated or further transformed). Each data record in this subset is tagged with tracer "B". This tracer may be written to a field contained within the actual data record. This shows the records that are out of scope for data transformation or migration and also indicate that rule which was the "trigger" (i.e., Rule B) that determined why the specific record was moved out of scope (i.e., moved into this subset at step 5). It should be noted that in various embodiments, not all transformation rules will be applied to every single data record that is loaded to a new system. Rather, there can be parallel processing paths in which data records are processed by different rules depending on the logic of a particular transformation and the results of logic decisions that occur in processing the data records.

At step 6, validation process 109 validates that the data records in the subset (step 5) deemed as part of the subset of data: universe of records not to be transformed and migrated are properly classified, as according to the list of transformation rules for data that are not intended to be migrated.

At step 7, the set of data which satisfies Rule A (step 4) will be deemed as part of the subset of data: universe of records to be transformed and migrated. This data can be written to a separate table, file, temp table, or simply considered as a virtual subset of data. The records in this category (satisfying Rule A) will be tagged with tracer "A" in the record tracer field. This tracer is written to a field contained within the actual data record.

At step 8, if it has been stipulated that the set of data in step 7 should be validated, then the data set can be reviewed by validation process 109 to determine if this set of data is properly classified. However, validation is an optional exercise and can be performed only as deemed necessary for a given situation.

At step 9, data that has previously passed Rule A is now subjected to ETL process 2. Records are transformed according to Rule C, and those records are tagged with tracer "C". At this point, these data records would now contain tracers "A" and "C" (this indicates that the data records have been previously processed by Rules A and C).

At step 10, data is now subjected to ETL process 3. Records are transformed according to Rule D and those records are tagged with tracer "D". At this point, these data records would now contain tracers "A", "C" and "D".

At step 11, data is now subjected to ETL process 4. At step 12, records which do not satisfy rule E (in this case a validation rule) are written to a separate table of "invalid" records (step 13). At step 13, these invalid records are tagged with tracer "A,C,D".

At step 14, the set of data in step 13 may be validated. If validated, the data set is reviewed by validation process 109 to determine if this set of data is properly classified. This validation is optional.

At step 15, records which satisfy rule E are written to a separate table of "valid" records. In this example, these would be the set of records ready for loading to the target system (in step 17). At step 15, the data records in this data set are all now tagged with tracers "A,C,D,E".

At step 16, if the set of data in step 15 is validated, then the data set is reviewed by validation process 109 to determine if this set of data is properly classified. This validation is optional.

At step 17, the final set of transformed data is loaded into the target system. The tracers from step 15 can be included in, or can be removed from, as may be desired, the data records when loading occurs. Configuration within the target system can be performed so that additional tracers are added at this point, based on other rules that are part of the loading process.

At step 18, the data records loaded to the target system can be extracted from the target system, or can be viewed directly. If the tracers were loaded to the target system as part of step 17, then this information is available in the extract or views.

At step 19, if the set of data in step 18 is to be validated, then the data set can be reviewed by validation process 109 to determine if this set of data is properly classified. If the loaded data does not contain the tracers, then the validation process refers back to a prior file that contains the tracers (e.g., a file created or extracted at step 15, such as for a validation process at step 16) to understand the history of the ETL process for a particular record.

Figure 6:
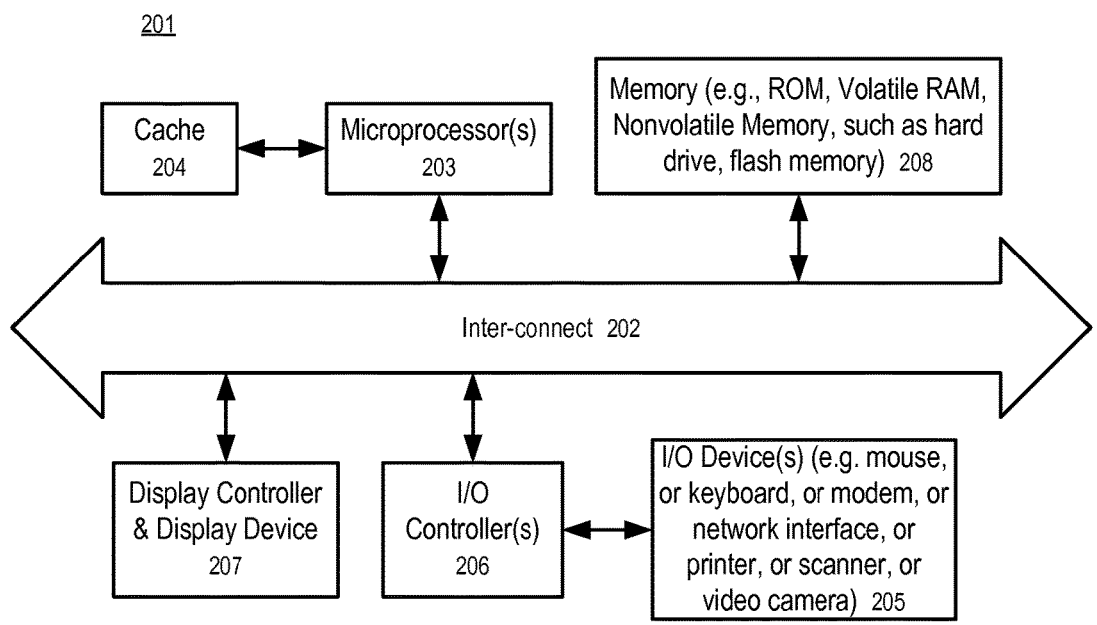
FIG. 6 shows a block diagram of a data processing system which can be used in various embodiments.

FIG. 6 shows a block diagram of a data processing system which can be used in various embodiments. While FIG. 6 illustrates various components of a computer system, it is not intended to represent any particular architecture or manner of interconnecting the components. Other systems that have fewer or more components may also be used.

In FIG. 6, the system 201 includes an inter-connect 202 (e.g., bus and system core logic), which interconnects a microprocessor(s) 203 and memory 208. The microprocessor 203 is coupled to cache memory 204 in the example of FIG. 6.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 6 is used to implement source system 103, target system 107, a computing device or server executing transformation engine 111, or a server or other computing device executing validation process 109.

In some embodiments, one or more servers or other computing devices of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Various additional, non-limiting embodiments and examples are now discussed below. In one embodiment, a business rule is an activity or processing that is desired to occur, or not to occur, to data sets or individual records. Often, business rules apply to whole records rather than fields, although there are exceptions. An example of a business rule is the plan to migrate only records from the U.S., and that any records from Canada or elsewhere will not be migrated. Business rules may apply to inclusion or exclusion of records, or a treatment of a particular record.

In one embodiment, mapping rules apply to field-level mapping. In a source system, there may be a database that consists of thousands, tens of thousands, or hundreds of thousands of tables. Data will be identified that will be will be mapped and moved into a target system. In the target system, there are fields into which equivalent data is moved from the source system into the target system. However, it may not be a one-for-one move. There may be an address master in the source system, for example, which may have five lines, but in the new system the fifth line of the address may be mapped to a separate custom field outside of the address master (e.g., due to the new system only having four lines).

Mapping is used to indicate where data will go from the source system into the specific field in the target system, and what will happen to that field during the migration or transformation. For example, in order to make a field work in the new system, the transformation may need to make sure that it is truncated to, for instance, fifty characters. In the source system, there may be a seventy-five character limit. In the target system there may be a fifty-character limit. A mapping rule may be, for example, a customer address field number that must be truncated to a maximum of fifty characters.

As an example of another mapping rule, a lookup table may be used that maps old codes (e.g., indicating a geographic location) into new codes (e.g., corresponding to the same or similar geographic locations). For example, the resulting value from the lookup table may be inserted into the target system. There may be external files, external tables, external logic, and/or other files that are in lookup or other forms of tables that need to be referenced as part of certain transformation processes that convert data into a desired format for loading into the target system.

In one embodiment, quality rules are used during the transformation process. For example, if a data record is less than a predetermined number of characters, then the data record is filled with leading zeros or a predetermined prefix. This is an example of where data is converted for the purpose of cleaning it up. In the case of a quality rule, there may be additional processing that is specific to cleaning data obtained from an existing operation and feeding other downstream systems (e.g., feeding of data may be done as part of regular, ongoing operations after the initial launch of a target system has been completed). For example, quality rules may be used as part of ongoing data quality, data governance, and/or data cleansing operations.

In one embodiment, source data can come from an ERP system. In a migration situation, it can come from old ERP systems or legacy systems. Source data may be, for example, a flat file, Excel files, Access files, database files, HTML data, or even unstructured data in some cases. As part of the transformation process, a company applies a set of rules or mappings in order to move the data from one system to another. In other cases, the data is converted from one data state to another.

In one embodiment, an extract, transform and load process includes the use of an engine or a set of programs. The programs can be manually joined together, can be part of a more integrated and cohesive ERP system implementation process, or can be a separate set of programs specifically built for ongoing data movement and transformation between one or more programs.

For example, in a migration sense, an ETL tool staging area is used to coordinate pulling the data from the source systems on file. It has logic programmed for the transformation that contains the rules and the actual processing for the data as it moves from its original form to the new, intended form. The load stage corresponds to any programs that are necessary for pushing the data or preparing the data after transformation for loading into one or more target systems.

In one embodiment, a target system can be an ERP system itself (it could be a flat file). A target system can also be any kind of interfacing application, such as a customer relationship management (CRM) system, a supplier relationship management system, or an inventory system, a web portal, or any kind of data repository, for example a warehouse business intelligence or business data warehouse.

In one embodiment, a transformation process is performed for millions or tens of millions of records and the data records are going through, for example, five, ten, fifteen, and sometimes hundreds of transformation rules. The validation process enables users or people familiar with the data to ensure that the transformation rules were applied properly to certain sets of data, and also to be able to test that during and after the process.

In one example, with reference to FIG. 5, Rule A is whether a data record is associated with North America. If the rule is satisfied, the data record continues to step seven. If the rule is not satisfied, such as where the data is a Brazilian record, then the data record is going to be dumped into a subset of records at step 5 that will not to be migrated. The data record is tagged with tracer B because it has been identified as a non-North American data record.

In one embodiment, a field is attached or appended to the data record. If for example in the legacy system there existed ten fields, then an eleventh data field is added to that data record. Alternatively, tracer data could be appended to the existing data fields. In other words, it's not necessary to create a new field for the tracer. Thus, in some field, either a new field or a designated existing field, information is appended that relates to the rules through which this record was processed.

In one embodiment, the transformation process is used as an ongoing data process (e.g., as part of data quality or data governance). For example, a hyphen may be added to a field to reformat a phone number as part of transferring data to a CRM system.

In one embodiment, after loading transformed data into the target system, one wants to review it because sometimes the data in the system did not load or transform in an intended way. At step 18 of FIG. 5, data that was loaded into the target system with tracers can then be viewed in, or exported from, the new system to determine what actually happened to that record as it was moved from the old system and went through the transformation process.

In one embodiment, the validation process is a secondary, systematic process with reports or databases written to provide data. It is a validation of the processes that have occurred in the transformation process from beginning to end.

In one embodiment, there may be a transformation rule which requires that a single record in the source data be propagated into three separate records for the target system. For example, a company may have one single record for a customer in its source system. However, the company may desire to create a customer record for each specific country in which it sells to this customer. In this example, the one record in the source data is, for example, CustomerX, which may become three distinct records in the target system (e.g., CustomerX_US, CustomerX_MX, CustomerX_CA). By adding a tracer to each of these records corresponding to the transformation rule that dictated this record proliferation, this facilitates the record count reconciliation, and makes more clear in the validation process and/or to the business user of the data, that these three records were proliferated from a single record as the result of processing through this specific transformation rule.

In one embodiment, the validation process includes creating a report which will pull data sets into an area or a directory where a user or customer can view the data with notations on it (e.g., tracers). So, for instance, if one wanted to validate a particular process step, a report is created that reads the output of that process step. This report may be, for example, a file or set of files, or a database or a flat set of records. That report is displayed on a viewing device (e.g., a display of a user computing device).

In one embodiment, a data record is extended or appended to add tracers. The data records can go through, for example, twenty-five rules. In one example, twenty-five new fields can be created in a tracer used for each field. In another example, existing fields can be modified to indicate tracers. In other examples, various tracer codes may be used which indicate combinations are sequences of transformation rules that have already been processed. In other words, there's not necessarily a need to be a one-to-one correspondence between a number of fields in a data record and the number of transformation rules that have been used to process the data record. In one embodiment, the tracer fields can accommodate characters, for example a field can use twenty-six characters plus some alphanumerics to correspond to particular rules used, and to the different outcomes from processing a rule (e.g., a portion of a tracer, or other data accompanying or being part of the tracer, may be used to indicate the outcome—this is in addition to merely indicating the particular rule that was used to process the data). In other embodiments, a binary number can be used to indicate rules that have been used to process the data (e.g., 1100101101010).

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:

receiving a plurality of data records, wherein the plurality of data records includes a first data record and a second data record;

processing, by at least one processor, the data records using a plurality of transformation rules, wherein each of the transformation rules corresponds to a respective one of a plurality of tracers, and the plurality of transformation rules includes a first rule and a second rule;

adding the tracers to the data records to indicate those of the transformation rules used to process each data record, wherein adding the tracers to the data records comprises appending a tracer code to each data record, or adding a tracer code to a field of each data record, and wherein a first tracer is added to the first data record after processing with the first rule, a second tracer is added to the first data record after processing with the second rule, and the first tracer is added to the second data record after processing with the first rule;

determining that a first subset of the plurality of data records fails to satisfy a validation rule;

in response to determining that the first subset fails to satisfy the validation rule, writing the first subset to a table of invalid records, wherein each of the invalid records is tagged with tracers indicating those of the plurality of transformation rules used to process the invalid records prior to failing to satisfy the validation rule;

writing those of the plurality of data records that satisfy the validation rule to a table of valid records;

after processing the valid records using the transformation rules, providing the valid records to a target system; and after providing the valid records to the target system, validating, using the tracers added to the valid records, that the processing of the valid records was properly performed, wherein the validating comprises confirming processing of the first data record based on tracers added to the first data record.

2. The method of claim 1, further comprising determining whether at least one filtration criterion of the first rule is satisfied by the plurality of data records.

3. The method of claim 2, wherein the transformation rules are part of a transformation process, the method further comprising removing a second subset of the data records from the transformation process in response to each of the second subset of data records failing to satisfy the at least one filtration criterion of the first rule.

4. The method of claim 1, wherein the transformation rules include business, mapping, and quality rules.

5. The method of claim 1, wherein the plurality of data records is received from a source system, and the processing using the plurality of transformation rules implements an extract, transformation, and load data migration process from the source system to the target system.

6. The method of claim 1, wherein the plurality of data records is received from a source system, and the processing using the plurality of transformation rules implements a transformation interface between the source system and the target system.

7. The method of claim 1, further comprising determining whether the second rule is satisfied by the second data record.

8. The method of claim 1, wherein the transformation rules are part of a transformation process, and the second data record is included in a second subset of data records removed from the transformation process after failing to satisfy the second rule.

9. A system, comprising:
    at least one processor; and
    memory storing instructions configured to instruct the at least one processor to:
        receive a plurality of data records, wherein the plurality of data records includes a first data record;
        process the data records using a plurality of transformation rules, wherein each of the transformation rules corresponds to a respective one of a plurality of tracers, wherein the plurality of transformation rules includes a first rule corresponding to a first tracer, and a second rule corresponding to a second tracer, and wherein the second rule is executed for a data record after processing with the first rule;
        during the processing of the data records, add the tracers to the data records to indicate those of the transformation rules used to process each data record, each tracer added to a data record after a corresponding respective rule is used to process the data record, wherein adding the tracers to the data records further comprises appending a tracer code to each data record, or adding a tracer code to a field of each data record, and wherein the first tracer is added to the first data record after processing with the first rule, and the second tracer is added to the first data record after processing with the second rule;
        determine that a first subset of the plurality of data records fails to satisfy a validation rule;
        in response to determining that the first subset fails to satisfy the validation rule, write the first subset to a table of invalid records, wherein each of the invalid records is tagged with tracers indicating those of the plurality of transformation rules used to process the invalid records prior to failing to satisfy the validation rule;
        write those of the plurality of data records that satisfy the validation rule to a table of valid records; and
        provide the valid records to a target system.

10. The system of claim 9, wherein the transformation rules are part of a transformation process, and the instructions are further configured to instruct the at least one processor to remove a second subset of the data records from the transformation process after failing to satisfy the second rule.

11. A non-transitory computer-readable storage medium storing computer-readable instructions, which when executed, cause a system to:
    receive a plurality of data records, wherein the plurality of data records includes a first data record and a second data record;
    process, by at least one processor, the data records using a plurality of transformation rules, wherein each of the transformation rules corresponds to a respective one of a plurality of tracers, wherein the plurality of transformation rules includes a first rule and a second rule;
    add the tracers to the data records to indicate those of the transformation rules used to process each data record, wherein adding the tracers to the data records comprises appending a tracer code to each data record, or adding a tracer code to a field of each data record, and wherein a first tracer is added to the first data record after processing with the first rule, and the first tracer is added to the second data record after processing with the first rule;
    determine whether the second rule is satisfied by the first data record;
    in response to determining that the second rule is satisfied by the first data record, add a second tracer to the first data record, wherein the second tracer corresponds to the second rule;
    determine that a subset of the plurality of data records fails to satisfy a validation rule;
    in response to determining that the subset fails to satisfy the validation rule, write the subset to a table of invalid records, wherein each of the invalid records is tagged with tracers indicating those of the plurality of transformation rules used to process the invalid records prior to failing to satisfy the validation rule;
    write those of the plurality of data records that satisfy the validation rule to a table of valid records; and
    provide the valid records to a target system.

* * * * *